US008190774B2

(12) United States Patent
Bolan et al.

(10) Patent No.: US 8,190,774 B2
(45) Date of Patent: May 29, 2012

(54) MANAGING VIRTUAL ADDRESSES OF BLADE SERVERS IN A DATA CENTER

(75) Inventors: Joseph E. Bolan, Cary, NC (US);
Gregory W. Dake, Durham, NC (US);
Scott N. Dunham, Raleigh, NC (US);
Andrew B. McNeill, Jr., Cary, NC (US);
Martin J. Tross, Haifa, IL (US);
Theodore B. Vojnovich, Cary, NC (US);
Ben-Ami Yassour, Haifa, IL (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 11/957,203

(22) Filed: Dec. 14, 2007

(65) Prior Publication Data

US 2009/0157941 A1    Jun. 18, 2009

(51) Int. Cl.
*G06F 15/16* (2006.01)
(52) U.S. Cl. ...................... 709/245; 709/221
(58) Field of Classification Search .............. 709/245
See application file for complete search history.

(56) References Cited

U.S. PATENT DOCUMENTS

| 6,009,479 A | 12/1999 | Jeffries |
| 6,098,116 A * | 8/2000 | Nixon et al. ............... 710/8 |
| 7,571,349 B2 * | 8/2009 | Levidow et al. ........... 714/15 |
| 2008/0101351 A1 * | 5/2008 | Nguyen et al. ............ 370/389 |

OTHER PUBLICATIONS

Vojnovich; BladeCenter BOFM Parameter Specification 0.94.005. doc; e server; Sep. 8, 2007; pp. 1-104; IBM Confidential.

* cited by examiner

*Primary Examiner* — Krista Zele
*Assistant Examiner* — Andrew Georgandellis
(74) *Attorney, Agent, or Firm* — Brandon C. Kennedy; Cynthia G. Seal; Biggers & Ohanian, LLP

(57) ABSTRACT

Methods, apparatus, and products for managing virtual addresses of blade servers in a data center are disclosed that include storing by a blade server management module ('BSMM'), in non-volatile memory of a blade server, a parameter block, the parameter block including one or more virtual addresses for communications adapters of the blade server and one or more action identifiers, each action identifier representing a type of address modification; detecting, by a basic input-output system ('BIOS') module of the blade server upon powering on the blade server, the parameter block; and modifying, by the BIOS module of the blade server in dependence upon the one or more action identifiers of the parameter block, an address of at least one communications adapter of the blade server.

20 Claims, 6 Drawing Sheets

MANAGING VIRTUAL ADDRESSES OF BLADE SERVERS IN A DATA CENTER

BACKGROUND OF THE INVENTION

1. Field of the Invention

The field of the invention is data processing, or, more specifically, methods, apparatus, and products for managing virtual addresses of blade servers in a data center.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Blade computers are increasingly being used to run critical applications that require a high level of redundancy and fault tolerance. Multiple blade computers are typically installed in complex data centers. Blade computers in a data center communicate through data communications networks and storage networks according to network adapter addresses assigned by the manufacturer of the network adapter. These addresses are typically static and unchangeable by a system administrator. Because the manufacturer-assigned addresses of the network adapters of a blade computer are typically unknown until a blade computer is installed and discovered in the data center, systems administrators are unable to pre-configure various data communications and storage network settings that involve network adapter addresses.

SUMMARY OF THE INVENTION

Methods, apparatus, and products for managing virtual addresses of blade servers in a data center are disclosed that include storing by a blade server management module ('BSMM'), in non-volatile memory of a blade server, a parameter block, the parameter block including one or more virtual addresses for communications adapters of the blade server and one or more action identifiers, each action identifier representing a type of address modification; detecting, by a basic input-output system ('BIOS') module of the blade server upon powering on the blade server, the parameter block; and modifying, by the BIOS module of the blade server in dependence upon the one or more action identifiers of the parameter block, an address of at least one communications adapter of the blade server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
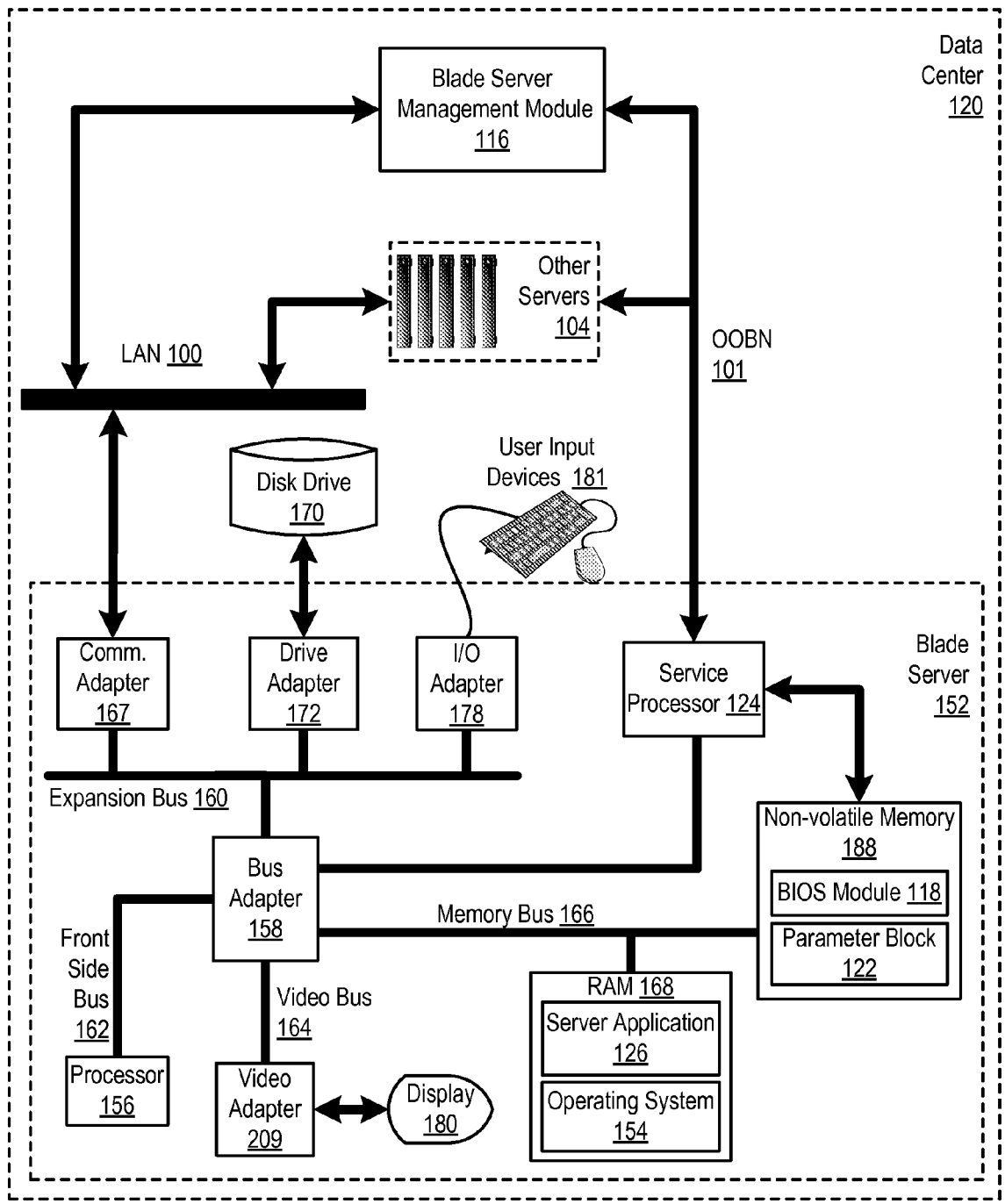
FIG. 1 sets forth a functional block diagram of an exemplary system implementing managing virtual addresses of blade servers in a data center according to embodiments of the present invention.

Exemplary methods, apparatus, and products for managing virtual addresses of blade servers in a data center in accordance with the present invention are described with reference to the accompanying drawings, beginning with FIG. 1. FIG. 1 sets forth a functional block diagram of an exemplary system that manages virtual addresses of blade servers in a data center according to embodiments of the present invention. The exemplary system of FIG. 1 includes a data center (120) that, in turn, includes several blade servers (104,152). The data center (120) is a facility used to house mission critical computer systems and associated components. Such a data center includes environmental controls (air conditioning, fire suppression, etc.), redundant/backup power supplies, redundant data communications connections, and high security, highlighted by biometric access controls to compartmentalized security zones within the facility. A data center is a facility used for housing a large amount of electronic equipment, typically computers and communications equipment. A data center is maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure. The example system of FIG. 1 includes a blade server (152) which is connected for data communications to other blade servers (104) through the local area network ('LAN') (100).

The example system of FIG. 1 also includes a blade server management module (116), an aggregation of computer hardware and software that is installed in a blade enclosure or blade center to provide support services for blade servers in the blade enclosure. Support services provided by the blade server management module (116) include monitoring health of blade servers and reporting health statistics to a system management server, power management and power control, save and restore configurations, discovery of available blade servers, event log management, memory management, and so on. An example of a blade server management module that can be used in systems that manage virtual addresses of blade servers in a data center according to embodiments of the present invention is IBM's Advanced Management Module ('AMM'). The blade server management module (116) in this example communicates with other computers, such as a system management server (not shown in FIG. 1) through the LAN (100), and communicates with the blade servers (152, 104) through an out-of-band network (101). The LAN may be implemented as an Ethernet, an IP (Internet Protocol) network, or the like, and the out-of-band network (101) may be implemented as an Inter-Integrated Circuit ('I²C') bus, a System Management Bus ('SMBus'), an Intelligent Platform Management Bus ('IPMB'), or the like.

The system of FIG. 1 includes an exemplary blade server (152) useful in managing virtual addresses of blade servers in a data center according to embodiments of the present invention. The blade server (152) of FIG. 1 includes at least one computer processor (156) or 'CPU' as well as random access memory (168) ('RAM') which is connected through a high speed memory bus (166) and bus adapter (158) to processor (156) and to other components of the system management server (152).

Stored in RAM (168) is a server application (126), a set of computer program instructions that provide a service (e.g. database access, file transfer, remote access) or resources (e.g. file space) over a network connection to one or more users. Examples of such a server application include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on Also stored in RAM (168) is an operating system (154). Operating systems useful for managing virtual addresses of blade servers in a data center according to embodiments of the present invention include UNIX™, Linux™, Microsoft XP™, AIX™, IBM's i5/OS™, and others as will occur to those of skill in the art. The operating system (154), the blade server application (182), the server failover module (184), and the SMI-S provider interface (186) in the example of FIG. 1 are shown in RAM (168), but many components of such software typically are stored in non-volatile memory also, such as, for example, on a disk drive (170) or in flash memory.

The blade server (152) of FIG. 1 includes disk drive adapter (172) coupled through expansion bus (160) and bus adapter (158) to processor (156) and other components of the blade server (152). Disk drive adapter (172) connects non-volatile data storage to the blade server (152) in the form of disk drive (170). Disk drive adapters useful in blade servers having one or more virtual addresses according to embodiments of the present invention include Integrated Drive Electronics ('IDE') adapters, Small Computer System Interface ('SCSI') adapters, and others as will occur to those of skill in the art. Non-volatile computer memory (188) also may be implemented as an optical disk drive, electrically erasable programmable read-only memory (so-called 'EEPROM' or 'Flash' memory), RAM drives, and so on, as will occur to those of skill in the art.

The example blade server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example blade server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary blade server (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for managing virtual addresses of blade servers in a data center according to embodiments of the present invention include modems for wired dial-up communications, Ethernet (IEEE 802.3) adapters for wired data communications network communications, and 802.11 adapters for wireless data communications network communications.

The example blade server of FIG. 1 operates generally for managing virtual addresses of blade servers in a data center according to embodiments of the present invention by storing, by a blade server management module ('BSMM') (116), in non-volatile memory (188) of a blade server (152), a parameter block (122), detecting, by a basic input-output system ('BIOS') module (118) of the blade server (152) upon powering on the blade server (152), the parameter block (122), and modifying, by the BIOS module (118) of the blade server (152) in dependence upon the one or more action identifiers of the parameter block (122), an address of at least one communications adapter (167) of the blade server (152). The parameter block (122) is a data structure that includes one or more virtual addresses for communications adapters of the blade server, and one or more action identifiers, each action identifier representing a type of address modification. For a more detailed description of a parameter block in accordance with various embodiments of the present invention see "VOJNOV-ICH; BladeCenter BOFM Parameter Specification 0.94.005.doc; e server; Sep. 8, 2007; pp. 1-104," hereby incorporated by reference in its entirety.

Each communications adapter has one or more addresses, referred to as network or storage addresses. A network address as the term is used in the specification refers to any data coding that uniquely or quasi-uniquely identifies a network adapter when the address is used in data communications networks. Examples of network addresses include MAC addresses, Ethernet Hardware Addresses, hardware addresses, adapter addresses, and so one as will occur to those of skill in the art. Network addresses may be used in data communications networks for many reasons including, for example, routing data communications traffic to particular destination devices. Network addresses are typically provided by the manufacturer of the network adapter and are typically never modified. In this way, the manufacturer-provided network adapters are almost always globally unique.

A storage address as the term is used in the specification refers to any data coding that uniquely or quasi-uniquely identifies a network adapter when the address is used in connecting blade servers to data storage. Examples of storage addresses include a network adapter number for an adapter that connects a blade server to the SAN, a port identifier of a data communications port that connects a blade server to the SAN, a combination of an adapter number and a port identifier, a WWN, a WWID, a World Wide Node Name ('WWNN'), a World Wide Port Name ('WWPN'), and so on. Just as network addresses are manufacturer-provided so also are storage addresses typically manufacturer provided and typically never modified.

A virtual address is a network or storage address that is assigned to a blade server, or more specifically a blade server's network adapter, by a user through a BSMM, not by a manufacturer of the network adapter or blade server. That is, virtual addresses appear to existing systems as any typical network or storage address, but are actually different than the original, manufacturer-provided network or storage addresses of the blade server.

A data center according to embodiments of the present invention may include one or more virtual address domains. A virtual address domain is a set of virtual addresses available for assignment to a set blade servers. A virtual address domain may, for example, include a set of virtual addresses available for assignment to all blades in a particular chassis. Two different virtual address domains may contain the same virtual addresses. In this way, a virtual address is not globally unique in contrast to most typical network or storage addresses.

In addition to virtual addresses the parameter block also includes one or more action identifiers. Each of the action identifiers represents a type of address modification that a BIOS module will perform. Action identifiers may represent such modifications as setting the communication adapter's original manufacturer-provided address to a virtual address, restoring an original address, updating a previously set virtual address to another virtual address, and others as will occur to those of skill in the art.

The BSMM (116) may store, in non-volatile memory (188) of a blade server (152), a parameter block (122) through the out of band network (101) and the blade server's service processor (124). A service processor is a processor included in a specialized microcontroller embedded on the motherboard of many computers, especially servers. The microcontroller manages the interface between system management software and platform hardware. An example of such a microcontroller useful in managing virtual addresses of blade servers in a data center is IBM's Baseboard Management Controller ('BMC') installed in many IBM blade servers.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
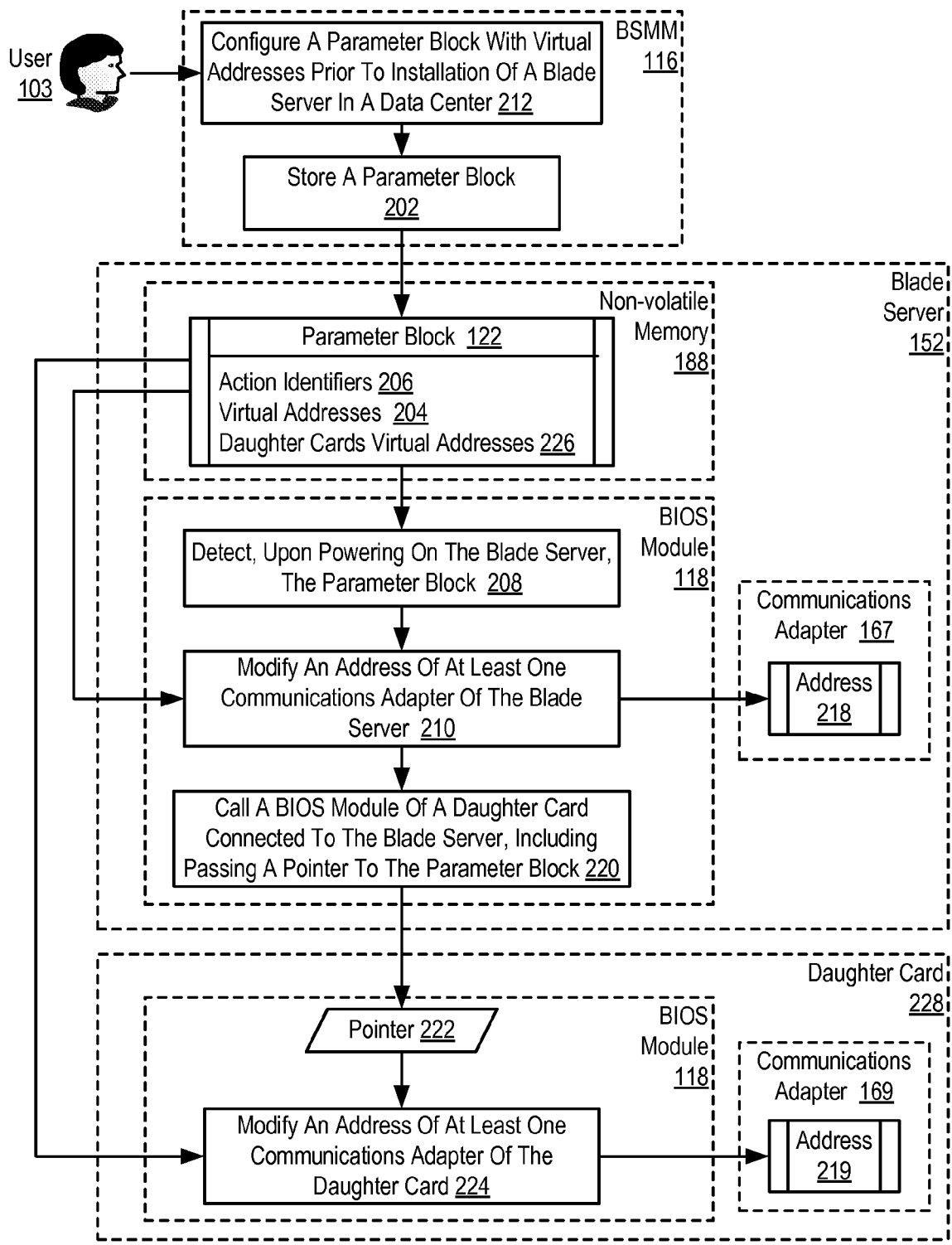
FIG. 2 sets forth a flow chart illustrating an exemplary method for managing virtual addresses of blade servers in a data center according to embodiments of the present invention.

For further explanation, FIG. 2 sets forth a flow chart illustrating an exemplary method for managing virtual addresses of blade servers in a data center according to embodiments of the present invention. The method of FIG. 2 includes configuring (212) by a user (103) a parameter block (122) with virtual addresses (204) prior to installation of a blade server (152) in the data center. The user (100) may configure the parameter block with virtual addresses through a graphical user interface presented by a management application running on the BSMM. Such a configuration of the parameter block in turn enables configuration of other system settings and parameters that use the blade server's addresses before the blade server is even installed in the system. In typical data centers, by contrast, configuration of system settings is not possible until the addresses of a blade server are known. Such addresses are typically known only after a blade server is installed and discovered.

The method of FIG. 2 also includes storing (202), by a BSMM (116), in non-volatile memory (188) of a blade server (152), a parameter block (122). The parameter block (122) in the method of FIG. 2 includes one or more virtual addresses (204) for communications adapters (167) of the blade server (152), and one or more action identifiers (206). Each action identifier (206) in the method of FIG. 2 represents a type of address modification. As mentioned above storing (202), by a BSMM, in non-volatile memory (188) of a blade server (152), a parameter block (122) may be carried out by sending the parameter block from the BSMM through an out of band network and a baseboard management controller.

The method of FIG. 2 also includes detecting (208), by a basic input-output system ('BIOS') module (118) of the blade server (152) upon powering on the blade server (152), the parameter block (122). A BIOS module refers to firmware code that runs when a computer is powered on. The primary function of a typical BIOS module is to identify and initiate component hardware, such as hard drives, floppies, and CD-ROMs. BIOS modules also initialize several motherboard components and peripherals including, for example:

A clock generator.
Processors and caches.

A chipset, including a memory controller and I/O controller.

The system memory.

All PCI devices (by assigning bus numbers and resources).

The primary graphics controller.

Mass storage controllers (such as SATA and IDE controllers).

Various I/O controllers (such keyboard/mouse and USB).

BIOS modules useful in managing virtual addresses of blade servers in a data center according to embodiments of the present invention are improved to detect such a parameter block as part of a Power on Self Test ('POST'). The BIOS module may detect the parameter block in various ways such as detecting data, such as a pointer to a memory location or a the parameter block itself, stored in a memory location specified for such a purpose, finding a flag set in a memory location indicating the presence of the parameter block, or in other ways as will occur to those of skill in the art.

The method of FIG. 2 also includes modifying (210), by the BIOS module (118) of the blade server (152) in dependence upon the one or more action identifiers (206) of the parameter block (122), an address (218) of at least one communications adapter (167) of the blade server (152). The BIOS module may modify an address of the communications adapter in various ways including setting the communication adapter's original manufacturer-provided address to a virtual address, restoring an original address, updating a previously set virtual address to another virtual address, as described in detail below with reference to FIGS. 3, 4, and 5.

In the method of FIG. 2, the parameter block (122) also includes one or more virtual addresses (226) for communications adapters (169) of daughter cards (228) connected to the blade server (152). A daughter card is a circuit board meant to be an extension or "daughter" of a motherboard, or occasionally another card. In particular, daughter cards often have plugs, sockets, pins, connectors, or other attachments for other boards, which is what differentiates them from a standard expansion board such as, for example, Peripheral Component Interconnect ('PCI') or Industry Standard Architecture ('ISA'). Daughter cards may be installed in chassis and connected to a blade server upon installation of the blade server in the chassis. Examples of daughter cards include Ethernet daughter cards, Fibre Channel daughter cards, and so on as will occur to those of skill in the art. The exemplary daughter card (228) in the method of FIG. 2 includes a communications adapter (169).

The method of FIG. 2 also includes calling by the BIOS module (118) of the blade server a BIOS module (118) of a daughter card (228) connected to the blade server (152), including passing to the BIOS module (118) of the daughter card a pointer (222) to the parameter block (122). BIOS modules (118) of the daughter cards (228) according to embodiments of the present invention, like the BIOS modules (116) of blade servers, are improved to detect a parameter block and modify a communications adapter's address.

The method of FIG. 2 also includes modifying (224), by the BIOS module (118) of the daughter card (228) in dependence upon the one or more action identifiers (206) of the parameter block (122), an address (219) of at least one communications adapter (169) of the daughter card (228). Modifying an address (219) of at least one communications adapter of the daughter card may be carried out by setting the communication adapter's original manufacturer-provided address to a virtual address, restoring an original address, or updating a previously set virtual address to another virtual address.

Figure 3:
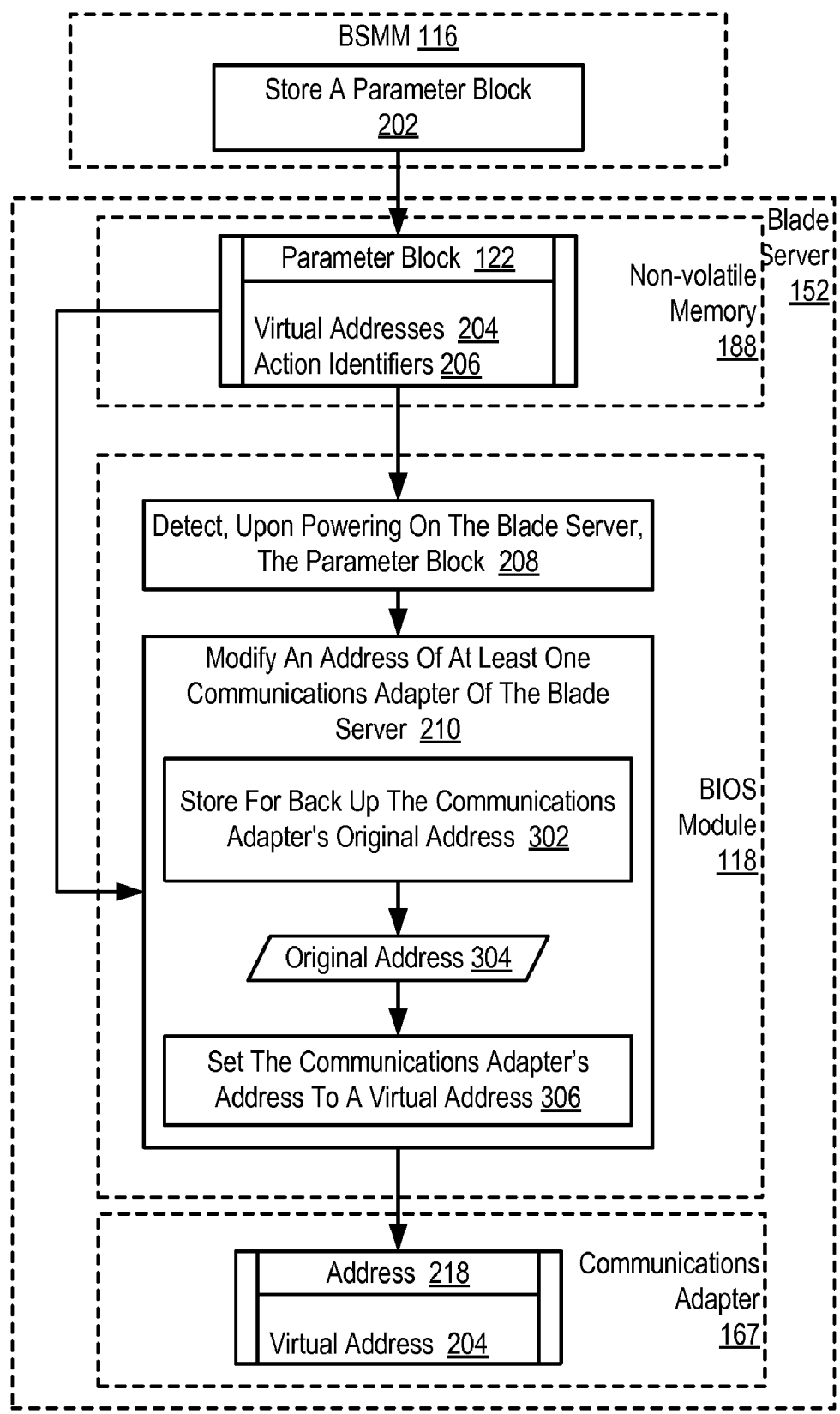
FIG. 3 sets forth a flow chart illustrating a further exemplary method for managing virtual addresses of blade servers in a data center according to embodiments of the present invention.

For further explanation, FIG. 3 sets forth a flow chart illustrating a further exemplary method for managing virtual addresses of blade servers in a data center according to embodiments of the present invention. The method of FIG. 3 is similar to the method of FIG. 2 including, as it does, the BSMM's storing (202) a parameter block (122), the BIOS module's (118) detecting (208) the parameter block (202), and the BIOS module's (118) modifying (210) an address (218) of at least one communications adapter (167) of the blade server (152).

The method of FIG. 3 differs from the method of FIG. 2, however, in that in the method of FIG. 3 modifying (210) an address (218) of at least one communications adapter (167) of the blade server (152) is carried out by storing (302) for back up the communications adapter's original address (304), and setting (306) the communications adapter's (167) address (218) to a virtual address (204) included in the parameter block (122). From time to time blade servers are removed from a virtual address domain and placed into service in another virtual address domain or in environments without virtual addresses. Because one virtual address may overlap with a virtual address of another virtual address domain or an original address, it is useful to store the communications adapter's original address such that the original, globally unique, address may be restored when the blade server is moved to another environment. Setting the address of the communications adapter to a virtual address may include writing the virtual address in the memory location of the original address, setting a flag indicating that a virtual address is to be used and writing the virtual address in a memory location dedicated for such a purpose, or in other ways as will occur to those of skill in the art.

Figure 4:
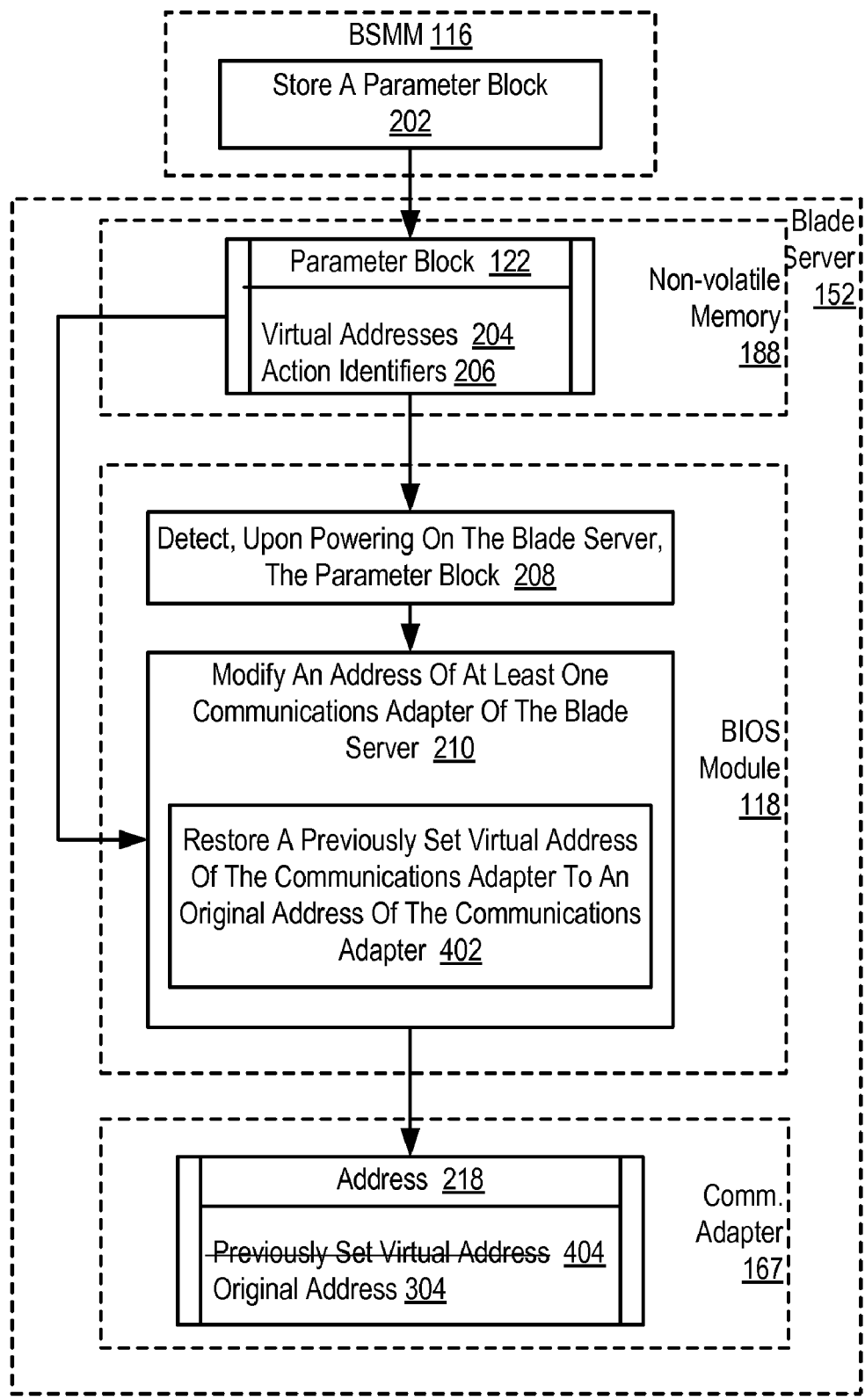
FIG. 4 sets forth a flow chart illustrating a further exemplary method for managing virtual addresses of blade servers in a data center according to embodiments of the present invention.

For further explanation, FIG. 4 sets forth a flow chart illustrating a further exemplary method for managing virtual addresses of blade servers in a data center according to embodiments of the present invention. The method of FIG. 4 is similar to the method of FIG. 2 including, as it does, the BSMM's storing (202) a parameter block (122), the BIOS module's (118) detecting (208) the parameter block (122), and the BIOS module's (118) modifying (210) an address (218) of at least one communications adapter (167) of the blade server (152).

The method of FIG. 4 differs from the method of FIG. 2, however, in that in the method of FIG. 4 modifying (210) an address (218) of at least one communications adapter (167) of the blade server (152) is carried out by restoring (402) a previously set virtual address (404) of the communications adapter (167) to an original address (304) of the communications adapter (167). As mentioned above, from time to time blade servers are removed from a virtual address domain and placed into service in another virtual address domain or in environments without virtual addresses. To eliminate overlap of a previously set virtual address (404) with a virtual address of another virtual address domain or an original address of another adapter, the BIOS module may restore the original address (304) of the adapter. The BIOS module may restore a previously set virtual address (404) to an original address (304) by finding the original address in a memory location dedicated for storing such an address and writing the original address in the memory location for the communications adapter's address (218). Alternatively, the BIOS module may restore a previously set virtual address (404) to an original address by removing a flag indicating that a virtual address should be used.

Figure 5:
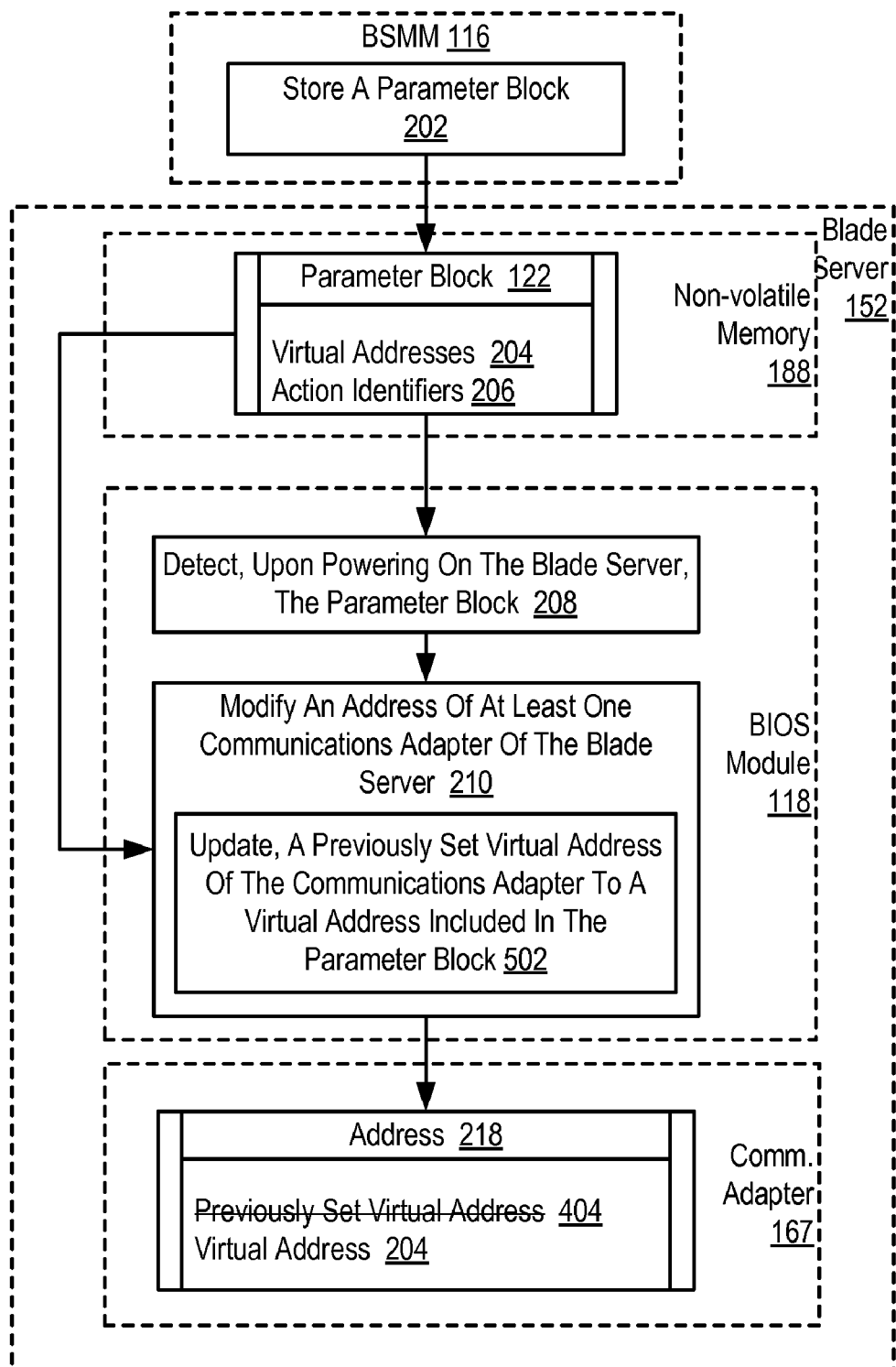
FIG. 5 sets forth a flow chart illustrating a further exemplary method for managing virtual addresses of blade servers in a data center according to embodiments of the present invention.

For further explanation, FIG. 5 sets forth a flow chart illustrating a further exemplary method for managing virtual addresses of blade servers in a data center according to embodiments of the present invention. The method of FIG. 5 is similar to the method of FIG. 2 including, as it does, the BSMM's storing (202) a parameter block (122), the BIOS module's (118) detecting (208) the parameter block (122), and the BIOS module's (118) modifying (210) an address (218) of at least one communications adapter (167) of the blade server (152).

The method of FIG. 5 differs from the method of FIG. 2, however, in that in the method of FIG. 5 modifying (210) an address (218) of at least one communications adapter (167) of the blade server (152) is carried out by updating (502), a previously set virtual address (404) of the communications adapter to a virtual address (204) included in the parameter block (122). From time to time a user may change the set of virtual addresses included in the virtual address domain in which the blade server is a part. In such cases, a previously set virtual address (404) may be effectively exchanged with a new virtual address (204) by updating the virtual address. In contrast to setting an original address of a communications adapter to a virtual address, updating a previously set virtual address to a virtual address included in the parameter block (122) does not include storing the previous address. Here, the previously set address is a virtual address, not the original, and there is no need to restore the previously set virtual address.

Figure 6:
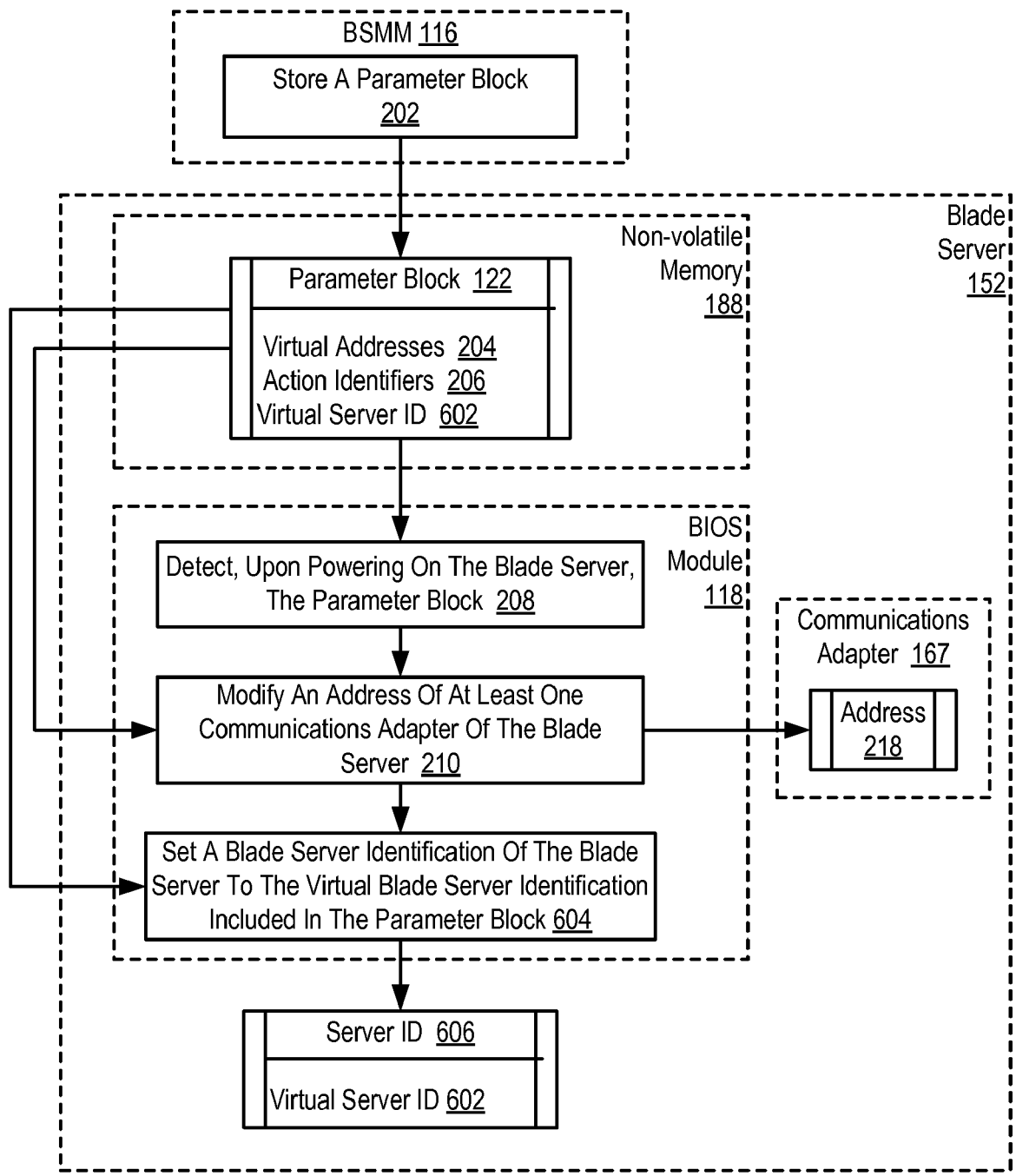
FIG. 6 sets forth a flow chart illustrating a further exemplary method for managing virtual addresses of blade servers in a data center according to embodiments of the present invention.

For further explanation, FIG. 6 sets forth a flow chart illustrating a further exemplary method for managing virtual addresses of blade servers in a data center according to embodiments of the present invention. The method of FIG. 6 is similar to the method of FIG. 2 including, as it does, the BSMM's storing (202) a parameter block (122), the BIOS module's (118) detecting (208) the parameter block (122), and the BIOS module's (118) modifying (210) an address (218) of at least one communications adapter (167) of the blade server (152).

The method of FIG. 6 differs from the method of FIG. 2, however, in that in the method of FIG. 6 the parameter block (122) also includes a virtual blade server identification (602). The method of FIG. 6 also differs from the method of FIG. 2 in that the method of FIG. 6 includes setting (604), in dependence upon the one or more action identifiers (206) of the parameter block (122), a blade server identification (606) of the blade server (152) to the virtual blade server identification (602) included in the parameter block (122). A blade server identification is a data coding universally and uniquely identifying a blade server, analogous in concept to a hardware serial number. In some cases applications or system management software in the data center may correlate the blade server identification to addresses used by the server. When pre-configuring a blade slot with virtual addresses, the blade server identification is typically unknown. To maintain correct correlation when pre-configuring a blade slot with virtual addresses, therefore, a virtual blade server identification may be assigned. In this way, the actual blade server identification of the blade server installed in the preconfigured slot is essentially ignored. Setting a blade server identification to a virtual blade server identification may also include storing the original blade server identification for later restoration.

Exemplary embodiments of the present invention are described largely in the context of a fully functional computer system for managing virtual addresses of blade servers in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing virtual addresses of blade servers in a data center, the method comprising:
   storing by a blade server management module ('BSMM'), in non-volatile memory of a blade server, a parameter block, the parameter block including one or more virtual addresses for communications adapters of the blade server and one or more action identifiers, each action identifier representing one of a plurality of types of address modification;
   detecting, by a basic input-output system ('BIOS') module of the blade server upon powering on the blade server, the parameter block; and
   modifying, by the BIOS module of the blade server in dependence upon the one or more action identifiers of the parameter block, an address of at least one communications adapter of the blade server.

2. The method of claim 1 wherein the parameter block further comprises one or more virtual addresses for communications adapters of daughter cards connected to the blade server, the method further comprising:
   calling by the BIOS module of the blade server a BIOS module of a daughter card connected to the blade server, including passing to the BIOS module of the daughter card a pointer to the parameter block; and
   modifying, by the BIOS module of the daughter card in dependence upon the one or more action identifiers of the parameter block, an address of at least one communications adapter of the daughter card.

3. The method of claim 1 wherein modifying, by the BIOS module of the blade server in dependence upon the one or more action identifiers of the parameter block, an address of at least one communications adapter of the blade server further comprises:
   storing for back up the communications adapter's original address; and
   setting the communications adapter's address to a virtual address included in the parameter block.

4. The method of claim 1 wherein modifying, by the BIOS module of the blade server in dependence upon the one or more action identifiers of the parameter block, an address of at least one communications adapter of the blade server further comprises:

restoring a previously set virtual address of the communications adapter to an original address of the communications adapter.

5. The method of claim 1 wherein modifying, by the BIOS module of the blade server in dependence upon the one or more action identifiers of the parameter block, an address of at least one communications adapter of the blade server further comprises:

updating, a previously set virtual address of the communications adapter to a virtual address included in the parameter block.

6. The method of claim 1 further comprising:

configuring by a user the parameter block with virtual addresses prior to installation of the blade server in the data center.

7. The method of claim 1 wherein the parameter block further comprises a virtual blade server identification and the method further comprises:

setting, in dependence upon the one or more action identifiers of the parameter block, a blade server identification of the blade server to the virtual blade server identification included in the parameter block.

8. An apparatus for managing virtual addresses of blade servers in a data center, the apparatus comprising a computer processor, a computer memory operatively coupled to the computer processor, the computer memory having disposed within it computer program instructions capable of:

storing by a blade server management module ('BSMM'), in non-volatile memory of a blade server, a parameter block, the parameter block including one or more virtual addresses for communications adapters of the blade server and one or more action identifiers, each action identifier representing one of a plurality of types of address modification;

detecting, by a basic input-output system ('BIOS') module of the blade server upon powering on the blade server, the parameter block; and modifying, by the BIOS module of the blade server in dependence upon the one or more action identifiers of the parameter block, an address of at least one communications adapter of the blade server.

9. The apparatus of claim 8 wherein the parameter block further comprises one or more virtual addresses for communications adapters of daughter cards connected to the blade server, the apparatus further comprising computer program instructions capable of:

calling by the BIOS module of the blade server a BIOS module of a daughter card connected to the blade server, including passing to the BIOS module of the daughter card a pointer to the parameter block; and modifying, by the BIOS module of the daughter card in dependence upon the one or more action identifiers of the parameter block, an address of at least one communications adapter of the daughter card.

10. The apparatus of claim 8 wherein modifying, by the BIOS module of the blade server in dependence upon the one or more action identifiers of the parameter block, an address of at least one communications adapter of the blade server further comprises:

storing for back up the communications adapter's original address; and setting the communications adapter's address to a virtual address included in the parameter block.

11. The apparatus of claim 8 wherein modifying, by the BIOS module of the blade server in dependence upon the one or more action identifiers of the parameter block, an address of at least one communications adapter of the blade server further comprises:

restoring a previously set virtual address of the communications adapter to an original address of the communications adapter.

12. The apparatus of claim 8 wherein modifying, by the BIOS module of the blade server in dependence upon the one or more action identifiers of the parameter block, an address of at least one communications adapter of the blade server further comprises:

updating, a previously set virtual address of the communications adapter to a virtual address included in the parameter block.

13. The apparatus of claim 8 further comprising computer program instructions capable of:

configuring by a user the parameter block with virtual addresses prior to installation of the blade server in the data center.

14. The apparatus of claim 8 wherein the parameter block further comprises a virtual blade server identification and the apparatus further comprises computer program instructions capable of:

setting, in dependence upon the one or more action identifiers of the parameter block, a blade server identification of the blade server to the virtual blade server identification included in the parameter block.

15. A computer program product for managing virtual addresses of blade servers in a data center, the computer program product disposed in a non-transmission computer readable medium, the computer program product comprising computer program instructions capable of:

storing by a blade server management module ('BSMM'), in non-volatile memory of a blade server, a parameter block, the parameter block including one or more virtual addresses for communications adapters of the blade server and one or more action identifiers, each action identifier representing one of a plurality of types of address modification;

detecting, by a basic input-output system ('BIOS') module of the blade server upon powering on the blade server, the parameter block; and modifying, by the BIOS module of the blade server in dependence upon the one or more action identifiers of the parameter block, an address of at least one communications adapter of the blade server.

16. The computer program product of claim 15 wherein the parameter block further comprises one or more virtual addresses for communications adapters of daughter cards connected to the blade server, the computer program product further comprising computer program instructions capable of:

calling by the BIOS module of the blade server a BIOS module of a daughter card connected to the blade server, including passing to the BIOS module of the daughter card a pointer to the parameter block; and modifying, by the BIOS module of the daughter card in dependence upon the one or more action identifiers of the parameter block, an address of at least one communications adapter of the daughter card.

17. The computer program product of claim 15 wherein modifying, by the BIOS module of the blade server in dependence upon the one or more action identifiers of the parameter block, an address of at least one communications adapter of the blade server further comprises:

storing for back up the communications adapter's original address; and setting the communications adapter's address to a virtual address included in the parameter block.

18. The computer program product of claim 15 wherein modifying, by the BIOS module of the blade server in dependence upon the one or more action identifiers of the parameter block, an address of at least one communications adapter of the blade server further comprises:

restoring a previously set virtual address of the communications adapter to an original address of the communications adapter.

19. The computer program product of claim 15 wherein modifying, by the BIOS module of the blade server in dependence upon the one or more action identifiers of the parameter block, an address of at least one communications adapter of the blade server further comprises:

updating, a previously set virtual address of the communications adapter to a virtual address included in the parameter block.

20. The computer program product of claim 15 further comprising computer program instructions capable of:

configuring by a user the parameter block with virtual addresses prior to installation of the blade server in the data center.

* * * * *